US012142046B2

(12) United States Patent
Grzesik et al.

(10) Patent No.: US 12,142,046 B2
(45) Date of Patent: Nov. 12, 2024

(54) METHOD AND SYSTEM FOR ENHANCING AUTHENTICITY DETAIL OF CAPTURED VIDEO

(71) Applicant: MOTOROLA SOLUTIONS, INC., Chicago, IL (US)

(72) Inventors: Andrzej Grzesik, Jaworzno (PL); Ramil Galiew, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 306 days.

(21) Appl. No.: 17/652,741

(22) Filed: Feb. 28, 2022

(65) Prior Publication Data
US 2023/0274546 A1   Aug. 31, 2023

(51) Int. Cl.
*G06V 20/40* (2022.01)
*G06K 19/06* (2006.01)
*H04L 9/08* (2006.01)
*H04L 9/32* (2006.01)

(52) U.S. Cl.
CPC ....... *G06V 20/46* (2022.01); *G06K 19/06009* (2013.01); *H04L 9/0825* (2013.01); *H04L 9/3297* (2013.01); *G06K 2019/06253* (2013.01); *H04L 2209/60* (2013.01)

(58) Field of Classification Search
CPC ............. G06V 20/46; G06K 19/06009; G06K 2019/06253; H04L 9/0825; H04L 2209/60
See application file for complete search history.

(56) References Cited

U.S. PATENT DOCUMENTS

| | | | |
|---|---|---|---|
| 6,591,095 B1 * | 7/2003 | Palaniswamy | H04W 12/069 455/425 |
| 6,782,115 B2 | 8/2004 | Decker et al. | |
| 7,725,717 B2 * | 5/2010 | Roux | H04L 9/321 713/168 |
| 8,312,284 B1 * | 11/2012 | Zheng | H04L 9/3297 713/178 |
| 8,538,020 B1 * | 9/2013 | Miller | H04L 9/0825 380/255 |
| 8,843,750 B1 * | 9/2014 | Sokolov | H04L 63/0823 713/175 |
| 9,001,206 B2 | 4/2015 | Wang et al. | |

(Continued)

FOREIGN PATENT DOCUMENTS

WO   WO-2018011267 A1 *   1/2018   ........... H04L 9/0825
WO   WO2020208270       *   4/2019   ............. G06Q 30/02

(Continued)

OTHER PUBLICATIONS

NPL History Search (Year: 2024).*

(Continued)

*Primary Examiner* — Samson B Lemma
*Assistant Examiner* — Richard W Cruz-Franqui

(57) ABSTRACT

A method and system for enhancing authenticity detail of captured video is disclosed. Objects within a physical environment (and visible within a camera field of view) are captured in video, and by way of video analytics these objects and their respective metadata are employed as part of the method and system for enhancing the authenticity detail of the captured video. Also, rather than the audio/video stream(s) being modified, the actual video scene itself may be modified.

19 Claims, 8 Drawing Sheets

(56) References Cited

U.S. PATENT DOCUMENTS

| | | | |
|---|---|---|---|
| 9,761,059 B2 | 9/2017 | Nistel et al. | |
| 10,412,318 B1* | 9/2019 | Ong | G06V 20/49 |
| 10,896,549 B1* | 1/2021 | Powers | G06T 15/205 |
| 11,368,289 B1* | 6/2022 | Kvochko | G06V 20/46 |
| 11,501,531 B2* | 11/2022 | Chuang | G06V 40/16 |
| 11,574,484 B1* | 2/2023 | Linzer | G06T 7/521 |
| 11,755,692 B2* | 9/2023 | Ur | H04L 65/764 |
| | | | 348/14.12 |
| 11,769,313 B2* | 9/2023 | Hassani | G06V 40/162 |
| | | | 382/118 |
| 11,869,319 B2* | 1/2024 | Howard | G07G 1/0045 |
| 11,922,532 B2* | 3/2024 | Alattar | G06T 1/0092 |
| 2004/0131184 A1* | 7/2004 | Wu | G08B 13/19647 |
| | | | 713/176 |
| 2006/0080546 A1* | 4/2006 | Brannon | H04L 63/08 |
| | | | 713/185 |
| 2006/0136718 A1* | 6/2006 | Moreillon | H04N 21/4147 |
| | | | 348/E7.071 |
| 2007/0050618 A1* | 3/2007 | Roux | H04L 9/321 |
| | | | 713/155 |
| 2007/0248224 A1* | 10/2007 | Buskey | H04L 9/3271 |
| | | | 380/30 |
| 2010/0290627 A1* | 11/2010 | Tsuji | H04L 9/0825 |
| | | | 380/282 |
| 2012/0147265 A1* | 6/2012 | Gu | H04N 21/472 |
| | | | 348/E7.001 |
| 2014/0043136 A1* | 2/2014 | Ristock | H04L 67/12 |
| | | | 340/5.1 |
| 2014/0071293 A1* | 3/2014 | Unnikrishnan | G06V 10/143 |
| | | | 348/E5.09 |
| 2014/0136847 A1* | 5/2014 | Huang | H04L 9/3234 |
| | | | 713/168 |
| 2014/0241614 A1* | 8/2014 | Lee | H04N 25/00 |
| | | | 382/154 |
| 2014/0282923 A1* | 9/2014 | Narayan | H04W 12/50 |
| | | | 726/5 |
| 2015/0065046 A1* | 3/2015 | Wilfred | H04W 12/50 |
| | | | 455/41.2 |
| 2015/0071524 A1* | 3/2015 | Lee | G06T 7/593 |
| | | | 382/154 |
| 2015/0235335 A1* | 8/2015 | Fung | H04N 23/80 |
| | | | 455/556.1 |
| 2016/0125252 A1* | 5/2016 | Harada | G06V 10/25 |
| | | | 382/103 |
| 2017/0017648 A1* | 1/2017 | Pearlman | G06T 1/0007 |
| 2017/0270630 A1 | 9/2017 | Creusen et al. | |
| 2017/0323543 A1* | 11/2017 | Glaser | H04N 1/3232 |
| 2018/0114030 A1* | 4/2018 | Sullivan | H04L 9/30 |
| 2018/0220189 A1* | 8/2018 | Hodge | G06F 16/7837 |
| 2018/0225717 A1* | 8/2018 | Storti | H04H 60/48 |
| 2018/0239939 A1* | 8/2018 | Tyagi | G06K 7/1417 |
| 2018/0268200 A1* | 9/2018 | Bandameedipalli | G06V 40/161 |
| 2018/0357486 A1* | 12/2018 | Lau | G06V 20/70 |
| 2019/0122063 A1* | 4/2019 | Kim | G06V 10/22 |
| 2019/0130188 A1* | 5/2019 | Zhou | G06T 7/248 |
| 2019/0179861 A1* | 6/2019 | Goldenstein | G06F 16/9535 |
| 2019/0240842 A1* | 8/2019 | Hsu | H04W 4/80 |
| 2019/0373237 A1* | 12/2019 | Limame | H04N 9/8715 |
| 2020/0065526 A1* | 2/2020 | Berman | G06T 1/0028 |
| 2020/0356790 A1* | 11/2020 | Jaipuria | G06T 11/00 |
| 2021/0004930 A1* | 1/2021 | Kamath | G06T 1/0028 |
| 2021/0117650 A1* | 4/2021 | Ye | G06T 7/97 |
| 2021/0117690 A1* | 4/2021 | Ye | G06V 40/176 |
| 2021/0117708 A1* | 4/2021 | Sandhan | G06V 40/161 |
| 2021/0203803 A1* | 7/2021 | Goldberg | H04L 9/0869 |
| 2021/0233204 A1* | 7/2021 | Alattar | G06T 1/005 |
| 2021/0328795 A1* | 10/2021 | Spitz | H04L 9/0825 |
| 2022/0067870 A1* | 3/2022 | Kronstadt | G06K 19/06037 |
| 2022/0284609 A1* | 9/2022 | Shree | G06T 7/33 |
| 2022/0286491 A1* | 9/2022 | White | H04N 21/4126 |
| 2022/0337392 A1* | 10/2022 | Schauer | H04L 9/3247 |
| 2022/0343006 A1* | 10/2022 | Ceballos Melo | G06F 21/6245 |
| 2022/0350867 A1* | 11/2022 | Cronin | G10L 25/57 |
| 2022/0353082 A1* | 11/2022 | Busch | H04L 9/3247 |
| 2022/0374641 A1* | 11/2022 | Hassani | G06V 10/30 |
| 2022/0374643 A1* | 11/2022 | Hassani | H04N 23/11 |
| 2023/0027643 A1* | 1/2023 | Dalley, Jr. | G08B 27/005 |
| 2023/0106011 A1* | 4/2023 | Marin | G06K 7/1421 |
| | | | 235/462.11 |
| 2023/0118532 A1* | 4/2023 | Benderius | G06V 40/171 |
| | | | 382/118 |
| 2023/0195906 A1* | 6/2023 | Aneja | G06N 3/084 |
| | | | 713/189 |
| 2024/0013572 A1* | 1/2024 | Yang | G06V 40/161 |

FOREIGN PATENT DOCUMENTS

| | | | | |
|---|---|---|---|---|
| WO | WO-2019178676 A1 * | 9/2019 | | G06F 16/743 |
| WO | WO-2021155348 A1 * | 8/2021 | | G06F 21/602 |
| WO | 2021256941 A1 | 12/2021 | | |

OTHER PUBLICATIONS

NPL Search History (Year: 2024).*

V. Amanipour and S. Ghaemmaghami, "Video-Tampering Detection and Content Reconstruction via Self-Embedding," in IEEE Transactions on Instrumentation and Measurement, vol. 67, No. 3, pp. 505-515, Mar. 2018, doi: 10.1109/TIM.2017.2777620.

* cited by examiner

METHOD AND SYSTEM FOR ENHANCING AUTHENTICITY DETAIL OF CAPTURED VIDEO

BACKGROUND

Although various types of manipulations of visual and auditory media have existed, been recognized, and been publicly discussed for some time, the recent entrance of so-called "deepfakes" has marked a turning point in the creation of fake content. Leveraging technological advances in artificial intelligence and machine learning, deepfakes can be manifested in, for example, fake video that is harder and harder for human observers to recognize the fake video for what it is. It is feared that the possibilities for deepfakes to deceive are endless—including manipulated pictures, videos, and audio—and thus the need to find solutions to address the growing problem is becoming more urgent, since deepfakes (as well as other types of falsifications of recorded media) will undoubtedly have a large societal impact.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
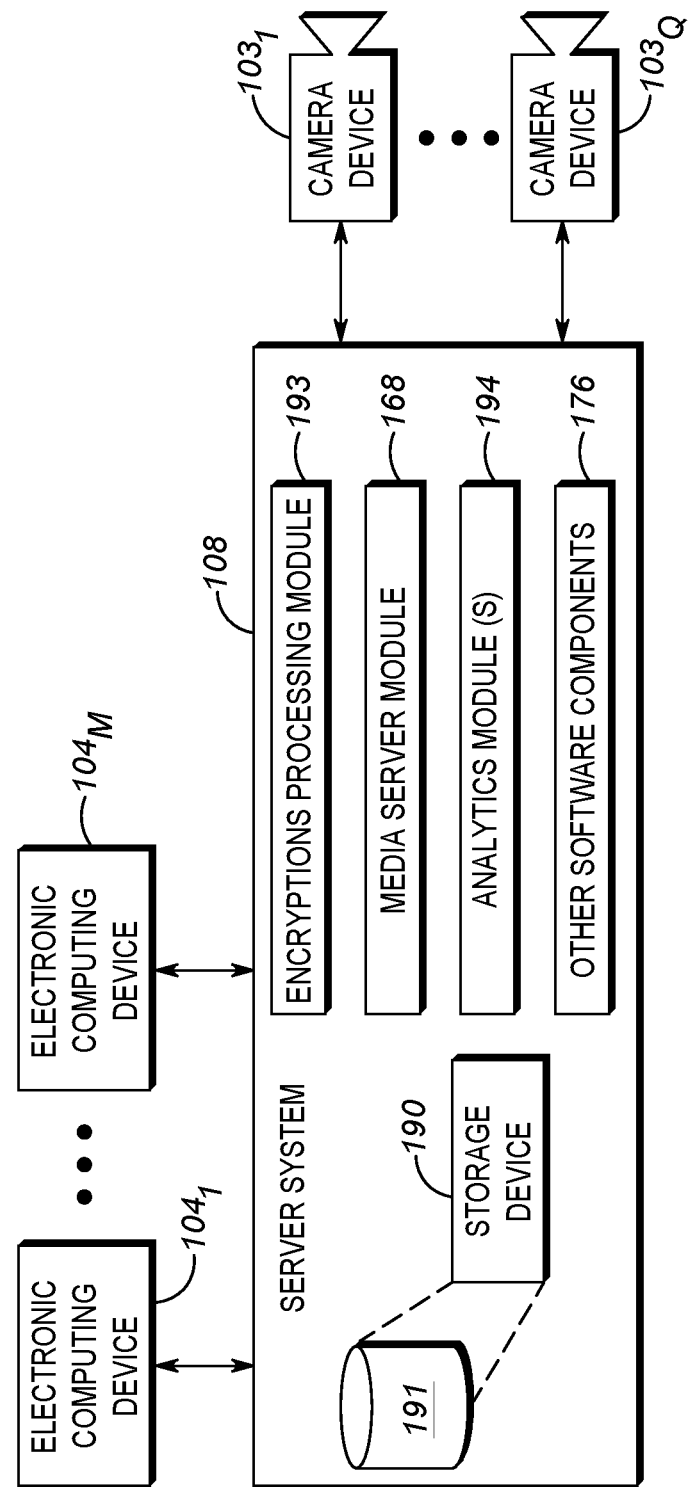
FIG. 1 is a block diagram showing a video system within which methods in accordance with example embodiments can be carried out.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method to enhance authenticity detail of video captured by a first camera having a first Field Of View (FOV). The computer-implemented method includes repeatedly carrying out the following over a period of time:

generating, during a respective sub-interval of a plurality of sub-intervals of the period of time, a data structure that is a combination of: i) at least one of timestamping data and a sequence number unique to the respective sub-interval of the period of time, and ii) aggregated metadata of a plurality of different objects visible within the first FOV, signing the data structure with a private key, and generating, from the signed data structure, a portion of a dynamically changing code for the respective sub-interval of the period of time.

The computer-implemented method also includes sequentially introducing the portions of the dynamically changing code within the first FOV to be visibly perceived therein. The computer-implemented method also includes operating the first camera to capture the video within which is shown the dynamically changing code and the different objects.

According to another example embodiment, there is provided an additional computer-implemented method to enhance authenticity detail of video captured by a first camera having a first Field Of View (FOV). The first camera also includes (or is locally coupled to) a microphone. The additional computer-implemented method includes repeatedly carrying out the following over a period of time:

generating, during a respective sub-interval of a plurality of sub-intervals of the period of time, a data structure that is a combination of: i) at least one of timestamping data and a sequence number unique to the respective sub-interval of the period of time, and ii) aggregated metadata of a plurality of different objects visible within the first FOV, signing the data structure with a private key, and generating, from the signed data structure, a portion of a dynamically changing code for the respective sub-interval of the period of time.

The additional computer-implemented method also includes sequentially introducing the portions of the dynamically changing code by production of data-over-sound sufficiently loud to be captured by the microphone. The additional computer-implemented method also includes concurrently with capturing of the data-over-sound by the microphone, operating the first camera to capture the video within which is shown the different objects. The video captured by the first camera includes the data-over sound as part of a sound track of the video.

According to yet another example embodiment, there is provided a system that includes at least one processor configured to repeatedly carry out the following over a period of time:

generate, during a respective sub-interval of a plurality of sub-intervals of the period of time, a data structure that is a combination of: i) at least one of timestamping data and a sequence number unique to the respective sub-interval of the period of time, and ii) aggregated metadata of a plurality of different objects visible within a camera FOV, sign the data structure with a private key, and generate, from the signed data structure, a portion of a dynamically changing code for the respective sub-interval of the period of time.

The system also includes an electronic projector or an electronic display configured to sequentially introduce the portions of the dynamically changing code within the camera FOV to be visibly perceived therein.

Each of the above-mentioned embodiments will be discussed in more detail below, starting with example system and device architectures of the system in which the embodiments may be practiced, followed by an illustration of processing blocks for achieving an improved technical method, system and computer program product for enhancing authenticity detail of captured video. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include humans, vehicles, animals, buildings, signs, etc. Also, it will be understood that the definition object is not limited to something that is the whole observable makeup of a person, animal, thing, etc. In this regard, a face of a person or a hand of a person may be examples of objects as well.

In accordance with a number of example embodiments, a variety of different locations at which video may be captured are contemplated. For example, the location may be an interview location (such as, for instance, an attorney office, police interview location, etcetera). As another example, the location may be some arbitrary location where a witness to an event happens to be. As yet another example, the location may be a geographic or building area with respect to which access is limited. Other examples of locations at which video may be captured are also contemplated.

Further advantages and features consistent with this disclosure will be set forth in the following detailed description, with reference to the figures.

Referring now to the drawings, and in particular FIG. 1 which is a block diagram of a video system 100 within which methods in accordance with example embodiments can be carried out. The video system 100 includes a plurality of video camera devices $103_1$-$103_Q$ (hereinafter interchangeably referred to as "video cameras $103_1$-$103_Q$" when referring to all of the illustrated video cameras, or "video camera 103" when referring to any individual one of the plurality) where Q is any suitable integer greater than one. The video system 100 also includes a plurality of electronic computing devices $104_1$-$104_M$ (hereinafter interchangeably referred to as "electronic computing devices $104_1$-$104_M$" when referring to all of the illustrated computing devices, or "electronic computing device 104" when referring to any individual one of the plurality) where M is any suitable integer greater than one. The video system 100 also includes a server system 108.

In some example embodiments, the electronic computing device 104 is a personal computer system; however in other example embodiments the electronic computing device 104 is a selected one or more of the following: a handheld device such as, for example, a tablet, a phablet, a smart phone or a personal digital assistant (PDA); a laptop computer; a smart television; a two-way radio; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the electronic computing device 104 rather than within the server system 108.

The electronic computing device 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the electronic computing device 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the electronic computing device 104 and the server system 108 are within the same Local Area Network (LAN). In some examples, the electronic computing device 104 communicates directly or indirectly with other parts of video system 100 besides the server system 108. For instance, it is contemplated that the electronic computing device 104 may communicate directly or indirectly with one or more of the video cameras $103_1$-$103_Q$.

Figure 2:
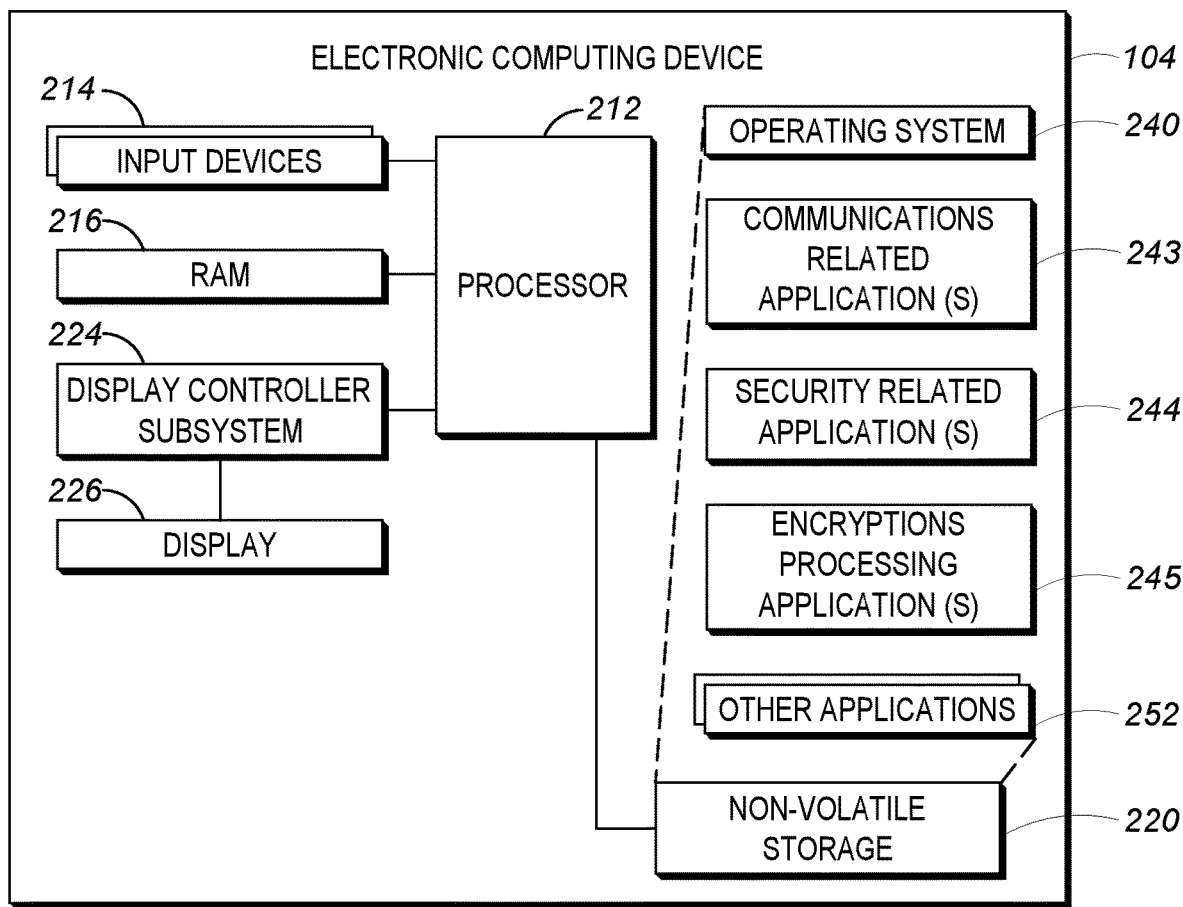
FIG. 2 is a block diagram showing more detail of one of the electronic computing devices shown in FIG. 1.

More details of the electronic computing device 104 are shown in FIG. 2. The electronic computing device 104 includes at least one processor 212 that controls the overall operation of the device. The processor 212 interacts with various subsystems such as, for example, input devices 214 (such as a selected one or more of a keyboard, mouse, touch pad, roller ball and voice control means, for example), random access memory (RAM) 216, non-volatile storage 220, display controller subsystem 224 and other subsystems. The display controller subsystem 224 interacts with display 226 and it renders graphics and/or text upon the display 226.

Still with reference to the electronic computing device 104 shown in FIG. 2, operating system 240 and various software applications used by the processor 212 are stored in the non-volatile storage 220. The non-volatile storage 220 is, for example, one or more hard disks, solid state drives, or some other suitable form of computer readable medium that retains recorded information after the electronic computing device 104 is turned off. Regarding the operating system 240, this includes software that manages computer hardware and software resources of the electronic computing device 104 and provides common services for computer programs. Also, those skilled in the art will appreciate that the operating system 240, communications related application(s) 243, security related application(s) 244, encryptions processing application(s) 245, and other applications 252, or parts thereof, may be temporarily loaded into a volatile store such as the RAM 216. The processor 212, in addition to its operating system functions, can enable execution of the various software applications on the electronic computing device 104.

Regarding the communications related application(s) 243, these can include any one or more of, for example, an email application, an instant messaging application, a talk group application, etc. Additionally, the communications related application(s) 243 may, in some examples, facilitate requests for (and/or receiving of) captured video from the server system 108.

Regarding the security related application(s) 244, this may include, for example, a Video Management Software (VMS) application to enable a user of the electronic computing device to carry out actions related to providing input in relation to images, live video and video recordings (such as, for instance, input to facilitate annotating or selectively exporting, to incident report folders, video footage captured by a plurality of video security video cameras). The security related application(s) 244 may also include other applications including for, example, a physical security application, an evidence management application, etc. Some examples of the electronic computing device 104 do not include the security related application(s) 244 (i.e. the security related application is an optional application that does not need to be provided within the electronic computing device 104).

Regarding the encryptions processing application(s) 245, this is one or more applications that may operate as a client-side cooperative counterpart to encryptions processing module 193 (FIG. 1) of the server system 108 (discussed later herein in more detail). Alternatively, in at least one example the encryptions processing application(s) 245 may take on part or all of the functionality of the encryptions processing module 193.

Referring once again to FIG. 1, the server system 108 includes several software components for carrying out other functions of the server system 108. For example, the server system 108 includes a media server module 168. The media server module 168 handles client requests related to storage and retrieval of video taken by video camera devices $103_1$-$103_q$ in the video system 100. In some examples, the media server module 168 may carry out other functions in relation to other forms of media communicated to the electronic computing device 104 from the server system 108. The server system 108 also includes server-side analytics module(s) 194 which can include, in some examples, any suitable one of known commercially available software that carry out computer vision related functions (complementary to any video analytics performed in the video cameras) as understood by a person of skill in the art. The server-side analytics module(s) 194 can also optionally include software for carrying out non-video analytics, such as audio analytics that may, for example, extract data from data-over-sound, convert spoken words into text, carry out audio emotion recognition, etc. The server system 108 also includes an encryptions processing module 193 for carrying out some or all of encryption/decryption functions implemented within the video system 100.

The server system 108 also includes a number of other software components 176. These other software components will vary depending on the requirements of the server system 108 within the overall system. As just one example, the other software components 176 might include special test and debugging software, or software to facilitate version updating of modules within the server system 108. The other software components 176 may also include one or more server-side modules that provide cooperative counterpart functionality to one or more of the communications related application(s) 243 and the security related application(s) 244 previously herein described.

Regarding the at least one storage device 190, this comprises, for example, one or more databases 191 which may facilitate the organized storing of recorded video and other data (such as, for example, one or more of incident-related data, keys and/or encryption-related data made available to the encryptions processing module 193, etcetera) in accordance with example embodiments. The one or more databases 191 may also contain metadata related to, for example, the recorded video that is storable within one or more storages. The one or more databases 191 may also optionally contain other types of metadata besides video metadata. Examples of metadata other than video metadata, that may be stored in the one or more databases 191, include audio metadata, Global Positioning System (GPS) location metadata, etcetera.

Still with reference to FIG. 1, the video camera 103 is operable to capture a plurality of video frames and produce video data representing the plurality of captured video frames. The video camera 103, a video capturing device, may include, for example, a security video camera, a mobile video camera wearable by a person, or some other type of fixed or mobile video camera. Furthermore, it will be understood that the video system 100 includes any suitable number of video cameras (i.e. Q is any suitable integer greater than zero). In at least one example where the video camera 103 is a wearable mobile video camera, the hardware and software components of both the video camera 103 and the electronic computing device 104 may optionally be all contained within a single device housing. In at least one other example where the video camera 103 is a fixed video camera, again the hardware and software components of both the video camera 103 and the electronic computing device 104 may optionally be all contained within a single device housing.

Figure 3:
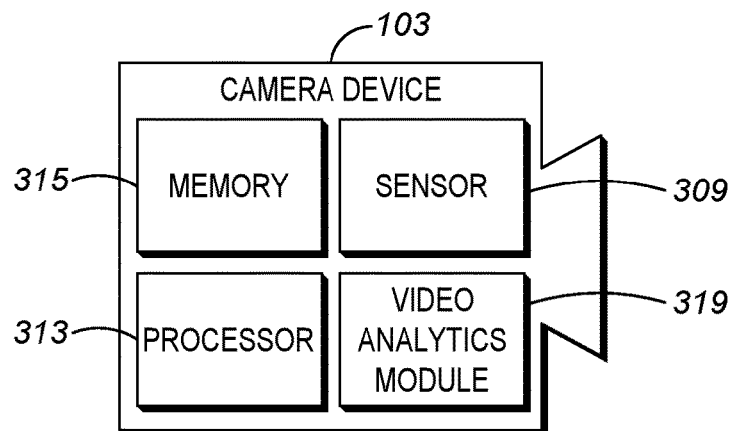
FIG. 3 is a block diagram showing more detail of one of the video cameras shown in FIG. 1.

More details of the video camera 103 are shown in FIG. 3. The video camera 103 includes an image sensor 309 for capturing a plurality of video frames. The video camera 103 may be a digital video camera and the image sensor 309 may output captured light as a digital data. For example, the image sensor 309 may be a CMOS, NMOS, or Charge-Couple Device (CCD). In some embodiments, the video camera 103 may be an analog video camera connected to an encoder. The illustrated video camera 103 may be a 2D video camera; however use of a structured light 3D video camera, a time-of-flight 3D video camera, a 3D Light Detection and Ranging (LiDAR) device, a stereo video camera, or any other suitable type of video camera within the video system 100 is contemplated.

The image sensor 309 may be operable to capture light in one or more frequency ranges. For example, the image sensor 309 may be operable to capture light in a range that substantially corresponds to the visible light frequency range. In other examples, the image sensor 309 may be operable to capture light outside the visible light range, such as in the infrared and/or ultraviolet range. In other examples, the video camera 103 may have characteristics such that it may be described as being a "multi-sensor" type of video camera, such that the video camera 103 includes pairs of two or more sensors that are operable to capture light in different and/or same frequency ranges.

The video camera 103 may be a dedicated video camera. It will be understood that a dedicated video camera herein refers to a video camera whose principal features are to capture images and video. In some example embodiments, the dedicated video camera may perform functions associated with the captured images or video, such as but not limited to processing the video data produced by it or by another video camera. For example, the dedicated video camera may optionally be a security video camera, such as any one of a pan-tilt-zoom video camera, dome video camera, in-ceiling video camera, box video camera, and bullet video camera.

Additionally, or alternatively, the video camera 103 may include an embedded video camera. It will be understood that an embedded video camera herein refers to a video camera that is embedded within a device that is operational to perform functions that are unrelated to the captured image or video. For example, the embedded video camera may be a video camera found on any one of a laptop, tablet, drone device, smartphone, physical access control device, video game console or controller.

The video camera 103 includes one or more processors 313, one or more video analytics modules 319, and one or more memory devices 315 coupled to the processors and one or more network interfaces. Regarding the video analytics module 319, this generates metadata outputted to the server system 108. The metadata can include, for example, records which describe various detections of objects such as, for instance, pixel locations for the detected object in respect of a first record and a last record for the video camera within which the respective metadata is being generated.

Regarding the memory device 315 within the video camera 103, this can include a local memory (such as, for example, a random access memory and a cache memory) employed during execution of program instructions. Regarding the processor 313, this executes computer program instructions (such as, for example, an operating system and/or software programs), which can be stored in the memory device 315.

In various embodiments the processor 313 may be implemented by any suitable processing circuit having one or more circuit units, including a digital signal processor (DSP), graphics processing unit (GPU) embedded processor, a visual processing unit or a vision processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the video camera 103, including the processor 313, may be combined together on one semiconductor chip. For example, the processor 313, the memory device 315 and the network interface of the video camera 103 may be implemented within a SOC. Furthermore, when implemented in this way, a general purpose processor and one or more of a GPU or VPU, and a DSP may be implemented together within the SOC.

In various example embodiments, the memory device 315 coupled to the processor 313 is operable to store data and computer program instructions. The memory device 315 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 315 may be operable to store in memory (including store in volatile memory, non-volatile memory, dynamic memory, etc. or any combination thereof). The memory device 315 need not necessarily be a single device, but instead may be comprised of a plurality of separately packaged electronic articles of manufacture inserted into, provided inside, or otherwise provided locally at the video camera 103.

As shown in FIG. 1, the video camera 103 is coupled to the server system 108. In some examples, the video camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the video camera 103 and the server system 108 can be any number of known arrangements, examples of which were previously herein detailed. In at least one example embodiment, the video camera 103 and the server system 108 are within the same Local Area Network (LAN). In some examples, the video camera 103 may be coupled to the server system 108 in a more direct manner than as described above.

Figure 4:
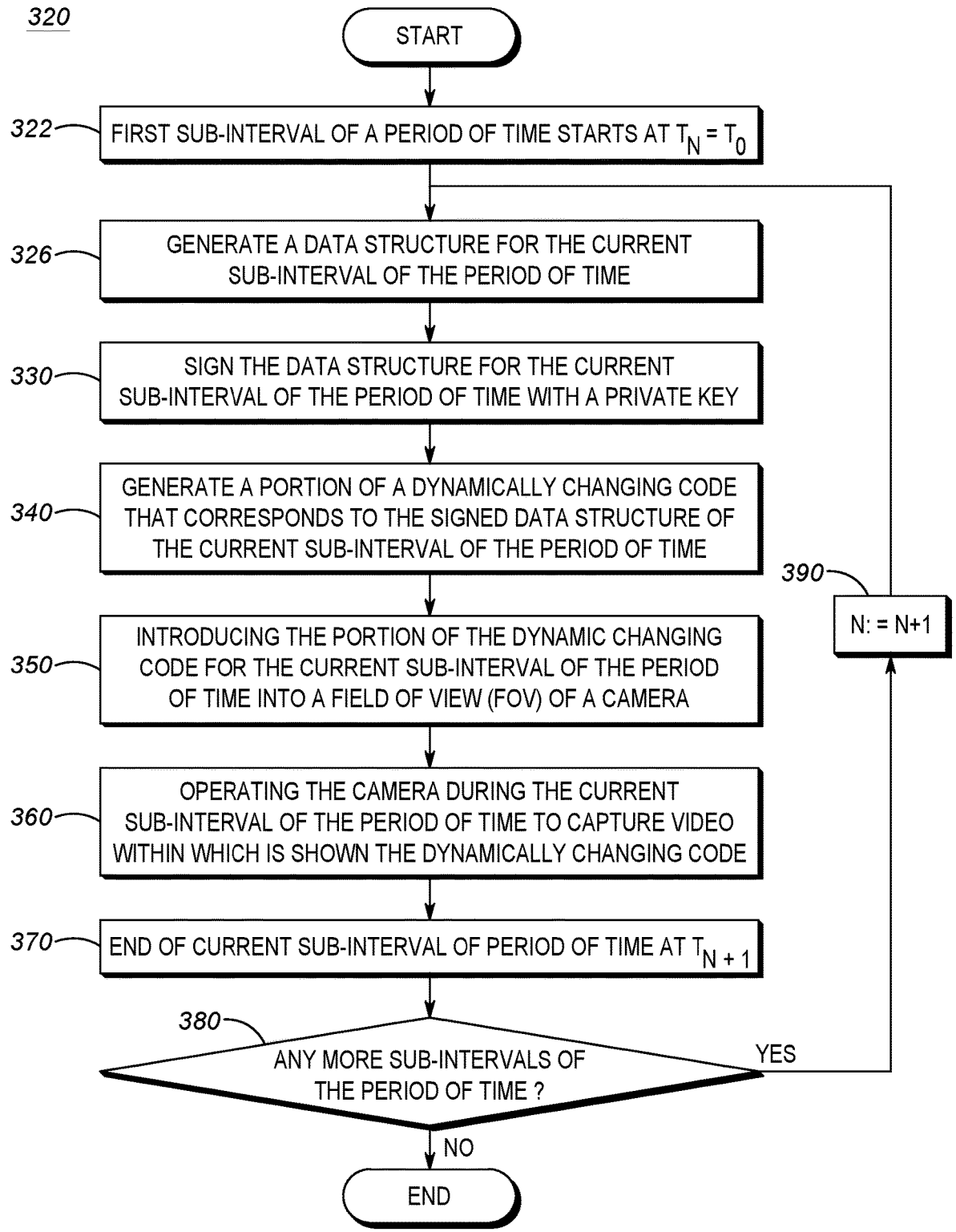
FIG. 4 is a flow chart illustrating a first computer-implemented method in accordance with an example embodiment.

Reference is now made to FIG. 4. FIG. 4 is a flow chart illustrating a method 320 of enhancing authenticity detail of video captured by a camera in accordance with an example embodiment.

In the illustrated method 320, a first sub-interval of a period of time starts (322) at $T_N=T_0$ (where N is an integer). (Also, it will be understood that each sub-interval of the plurality of sub-intervals forming a period of time may, in at least some examples, be corresponding to more than just one actual video frame, i.e. a plurality of video frames.)

Next, the illustrated method 320 of FIG. 4 includes generating (326) a data structure for the current sub-interval of the period of time. In at least some examples, this data structure is a combination of: i) at least one of timestamping data and a sequence number unique to the respective sub-interval of the period of time, and ii) aggregated metadata of a plurality of different objects visible within a first FOV (first FOV being, for example, an FOV of one of the video camera devices $103_1$-$103_q$ shown in FIG. 1). In some examples, the aggregated metadata of the plurality of different objects is created from video analytics processing of frames of the video (for example, by operation of the video analytics module 319 shown in FIG. 3, the analytics module 194 shown in FIG. 1, or some combination of those two modules). Also, it will be understood that the aggregated metadata (of the plurality of different objects) may describe temporally changing features of the different objects.

Different types of objects are contemplated. For example, the object may be a person, or the object may be only a part of person such as, for instance, a person's face or a person's hand. In any event, each selected object becomes a marker. Collectively the markers need not necessarily correspond to more than one persons-of-interest, or even some combination of a person-of-interest plus non-living object(s). It is also contemplated that the markers may collectively correspond to different objects (for instance, body parts) that form a part of just a single person.

Continuing on in respect of the illustrated method 320, next is signing (330) the data structure for the current sub-interval of the period of time with a private key. For instance, the markers corresponding to the aforementioned selected objects are signed with the private key. More specifically, in one example embodiment a to-be-signed data structure is formed of a distilled data vector (i.e. markers vector) in combination with timestamping data and/or a sequence number, and the to-be-signed data structure is signed with the private key. In some examples, the action 330 is carried out by the encryptions processing module 193 of the server system 108 (FIG. 1), or the encryptions processing application(s) 245 of the electronic computing device 104 (FIG. 2), or some a combination of the two.

Next the illustrated method 320 includes generating (340) a portion of a dynamically changing code that corresponds to the signed data structure of the current sub-interval of the period of time.

Next the illustrated method 320 includes introducing (350) the portion of the dynamically changing code for the current sub-interval of the period of time into an FOV (not necessarily the same FOV as the aforementioned "first FOV") of an active camera (for example, of one of the video camera devices $103_1$-$103_q$).

Figure 5:
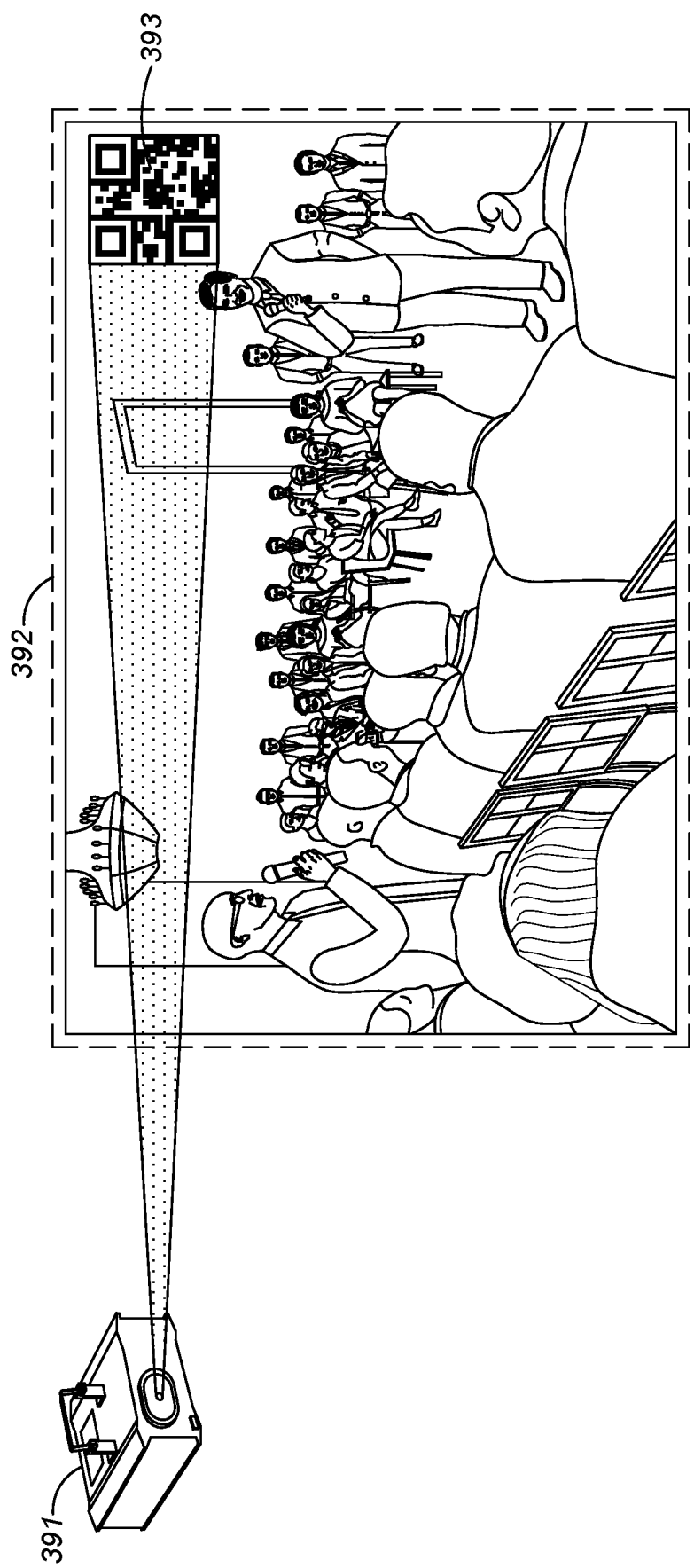
FIG. 5 is a diagram showing a code projection example in accordance with an example embodiment.

As one contemplated possibility of the action 350, reference is made to FIG. 5 which shows code projection example in accordance with an example embodiment. In FIG. 5, an electronic projector device 391 projects a QR code 393 so as to be visible on a surface within FOV 392. It will be understood by those skilled in the art that other alternative types of dynamically changing codes besides a QR code are contemplated such as, for example, a barcode, a pictogram, formatted text, a dot-based code, a light intensity code, or a changing symbol.

Figure 6:
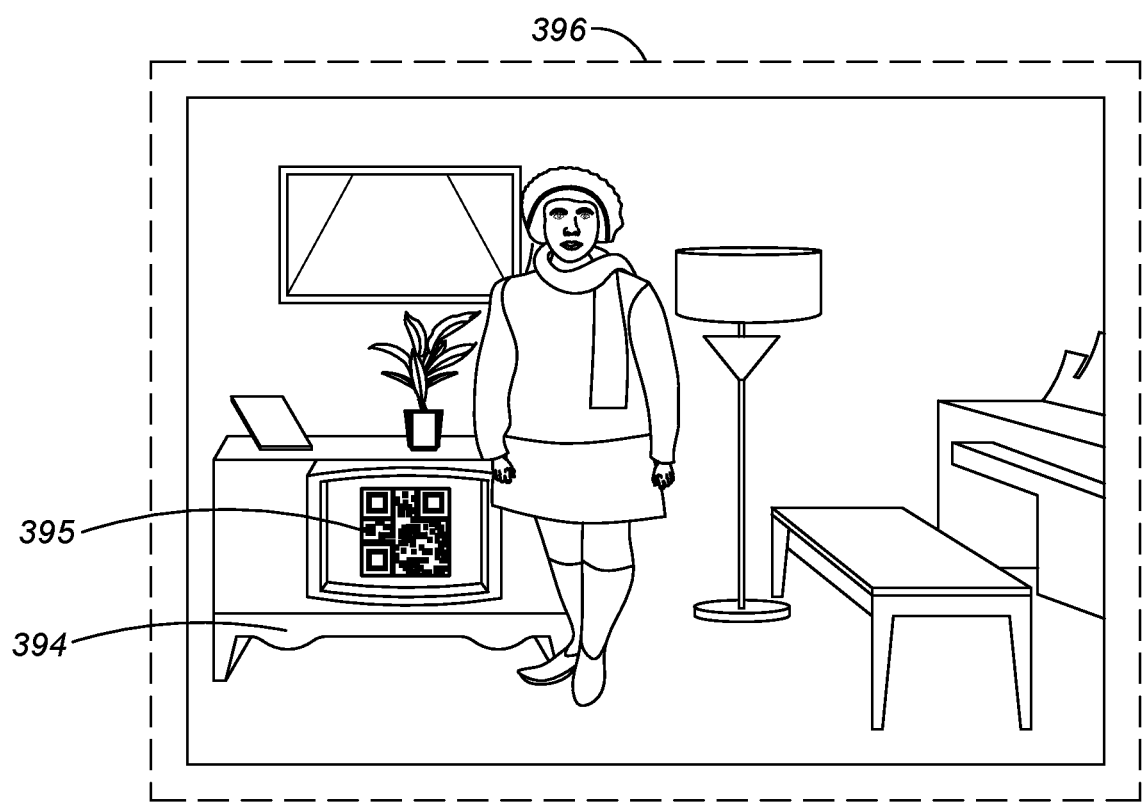
FIG. 6 is a diagram showing a code display example in accordance with an example embodiment.

As another contemplated possibility of the action 350, reference is made to FIG. 6 which shows code display example in accordance with an example embodiment. In FIG. 6, a display device 394 (for example, a television, computer monitor, etc.) displays a QR code 395 so as to be visible within FOV 396. As mentioned before, those skilled in the art will be aware of other alternative types of dynamically changing codes besides a QR code.

Next the illustrated method 320 includes operating (360) the aforementioned active camera during the current sub-interval of the period of time to capture video within which is shown the dynamically changing code. The captured video may be stored locally at the same camera device (for example, the memory 315 of the video camera 103 shown in FIG. 3). Alternatively, the captured video may be transmitted over a network for remote storage (for example, transmitted from the video camera 103 (that captures the video) for storage in the storage device 190 of the server system 108 as previously described in relation to FIG. 1). Once the captured video is stored on the storage device 190, then at some suitable later point in time the video may be transmitted over a network from the server system 108 to one or more of the electronic computing devices $104_1$-$104_M$ (i.e. as previously herein described) for viewing thereon. As yet another contemplated possibility (such as, for instance, in enhanced video security use cases) the verification part of the video authenticity need not necessarily occur at a later point in time on recorded video. In this regard, it is also contemplated that the verification part may be carried out on live video. In at least one example embodiment, herein disclosed computer-implemented methods may be incorporated into multi-factor identification for an access control system (such as, for example, an access control system that includes facial recognition as one factor of identification).

In at least one example, the electronic computing device 104 may employ its encryptions processing application 245 (FIG. 2) to verify authenticity of received video by way of a counterpart method 400 (i.e. method that is counterpart to the method 320) shown in FIG. 7 (and described later herein).

Now continuing on, and with reference still to FIG. 4, the illustrated method 320 further includes the current sub-interval of the period of time ending (370) at $T_{N+1}$.

Next the illustrated method 320 includes decision action 380 in which it is determined whether or not there are any more sub-intervals of the period of time. If "NO", then the method 320 ends. If "YES", then the illustrated method 320 proceeds to the next sub-interval of the period of time (i.e. action 390—incrementation of N by 1).

Following the action 390, the actions 326, 330, 340, 350, 360 and 370 are repeated.

Figure 7:
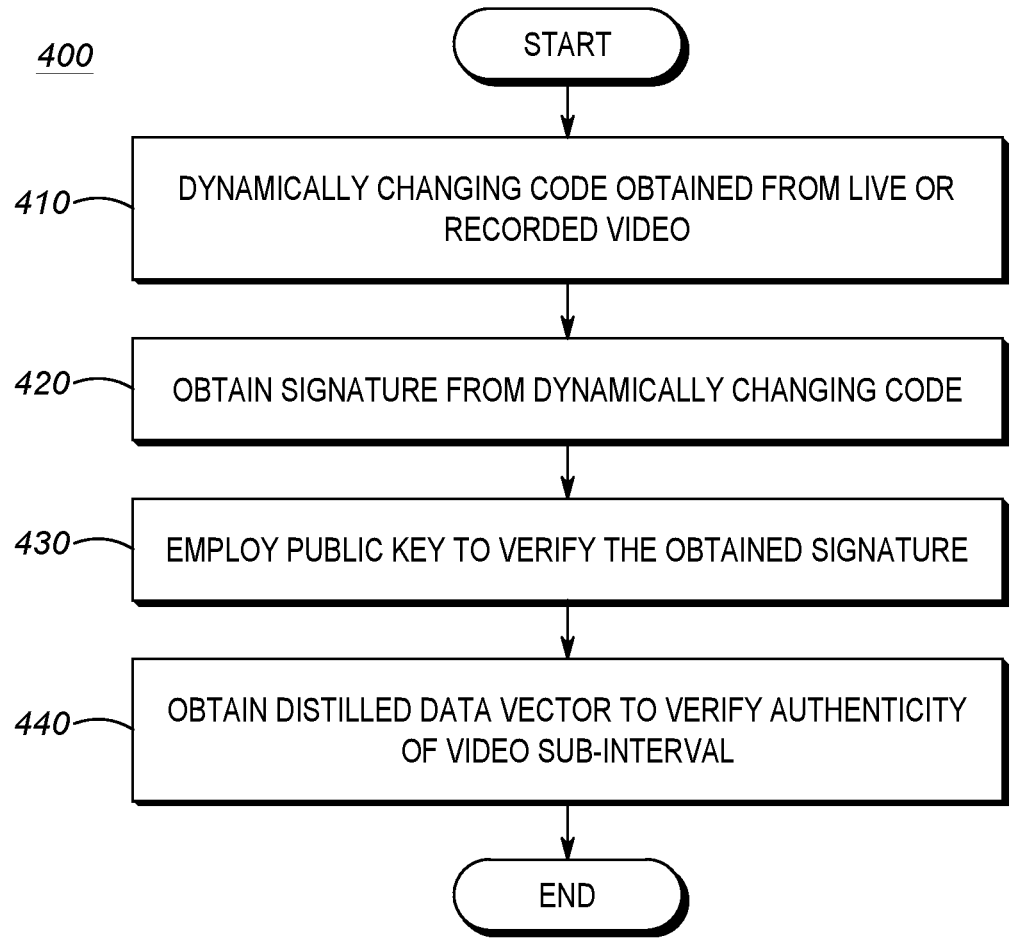
FIG. 7 is a flow chart illustrating, in accordance with an example embodiment, a verification method that is a counterpart method for the computer-implemented method of FIG. 4.

Reference is now made to FIG. 7. As a preliminary matter for this figure, it will noted that, for convenience of simplified illustration of the method 400, only the actions for one sub-interval associated with a longer time period (i.e. video duration time period) are shown; however it will be appreciated that the herein described actions can be repeated as needed over a plurality of such sub-intervals. Also, in the description of the method 400 that follow, it will be understood that, in practice, not all actions are tied to a single video frame within a particular sub-interval of the overall video duration time period. For example, a local generation of a data vector may be tied to one video frame in a particular sub-interval that is at least one video frame in sequence before the capturing of a QR code (i.e. from live or recorded video).

Continuing on and still with reference to FIG. 7, a dynamically changing code (for example, QR code or alternative type of code) is obtained (410) from live or recorded video.

Next, the content of the dynamically changing code may be read to obtain (420) the signature (i.e. the signature that was used for signing).

Next, the obtained signature can be verified by employing (430) a public key in accordance with any suitable process (the implementation details of which will be understood by those skilled in the art).

Next, the distilled data vector can be obtained (440) from the dynamically changing code, and from there timestamping, the sequence number and/or selected objects corresponding to the markers can be comparatively scrutinized against a locally generated data vector (where each of the locally generated data vector and the obtained data vector may trace back to different video frames within a same sub-interval) to confirm or reject authenticity of the video received or stored at the electronic computing device 104. Unlike the verification of the signature, verification of the data vector is carried out without the public key being employed.

It will be understood that the above described and illustrated example embodiment is a verifying implementation where both the data vector and the signature are verified. In an alternative example embodiment, only the signature might be verified (such as, for instance, where the QR code contains the signature but does not contain the data vector).

Figure 8:
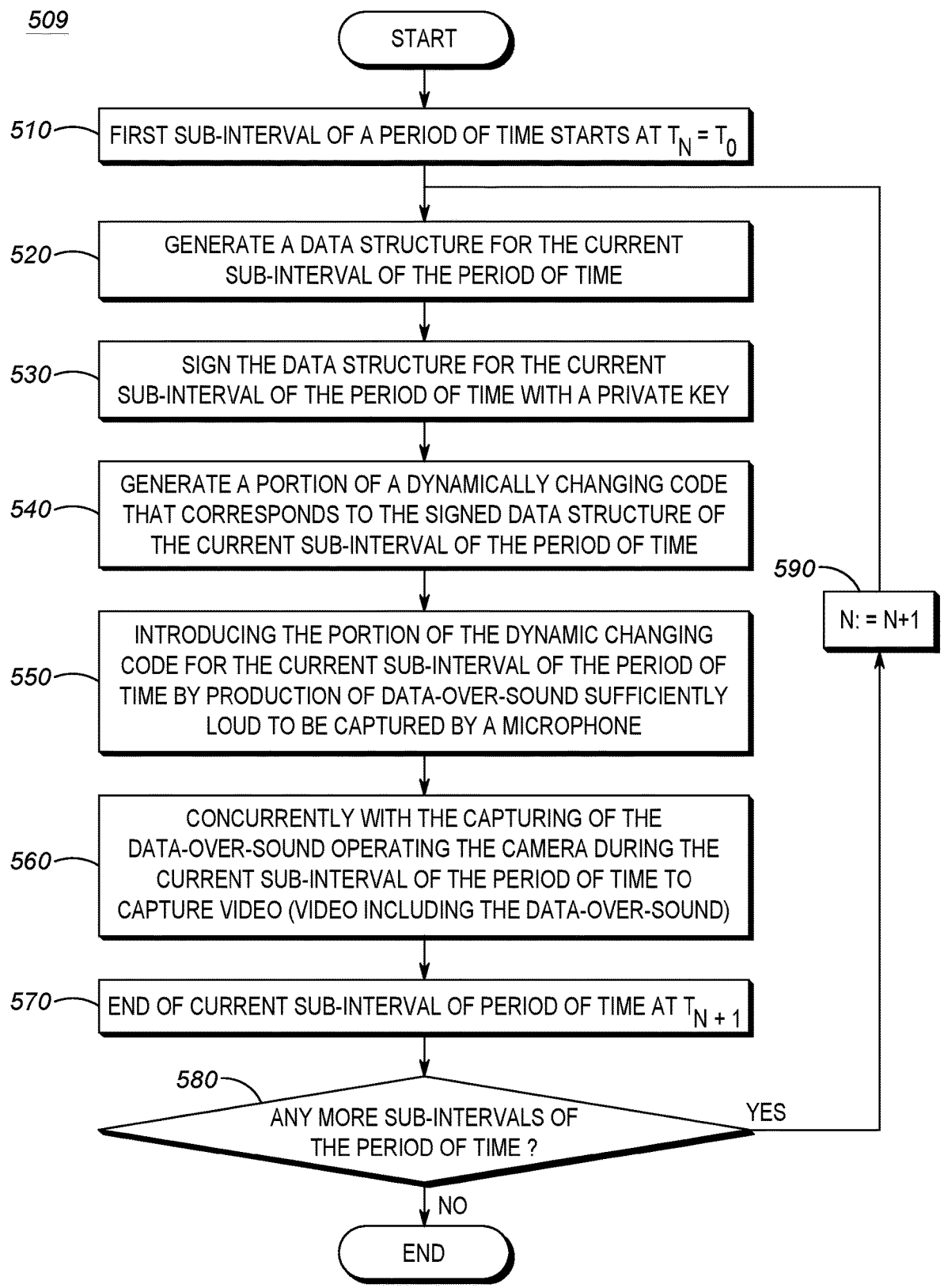
FIG. 8 is a flow chart illustrating a second computer-implemented method in accordance with an example embodiment.

Reference is now made to FIG. 8. FIG. 8 is a flow chart illustrating a method 509 of enhancing authenticity detail of video captured by a video camera in accordance with a second example embodiment. The illustrated method 509 includes a first sub-interval of a period of time starting (510) at $T_N = T_0$ (where N is an integer).

Next the illustrated method 509 of FIG. 8 includes generating (520) a data structure for the current sub-interval of the period of time. In at least some example, this data structure is a combination of: i) at least one of timestamping data and a sequence number unique to the respective sub-interval of the period of time, and ii) aggregated metadata of a plurality of different objects visible within a first FOV (first FOV being, for example, of one of the video camera devices $103_1$-$103_q$ shown in FIG. 1). More details in relation the action 520 were previously described in relation to FIG. 4, and hence are not repeated here in the interests of conciseness.

Next the illustrated method 509 includes signing (530) the data structure for the current sub-interval of the period of time with a private key. More details in relation the action 530 were previously described in relation to FIG. 4, and hence are not repeated here in the interests of conciseness.

Next the illustrated method 509 includes generating (540) a portion of a dynamically changing code that corresponds to the signed data structure of the current sub-interval of the period of time. More details in relation the action 540 were previously described in relation to FIG. 4, and hence are not repeated here in the interests of conciseness.

Next the illustrated method 509 includes introducing (550) the portion of the dynamically changing code for the current sub-interval of the period of time by production of a data-over-sound sufficiently loud to be captured by a microphone. For instance, with reference to the diagram of FIG. 9 providing an illustrative example, there is a speaker 802 emits data-over-sound within a scene (or location) 806, sufficiently loud to be captured via microphone 810 coupled or integral to the camera device 103 having FOV 814.

Figure 9:
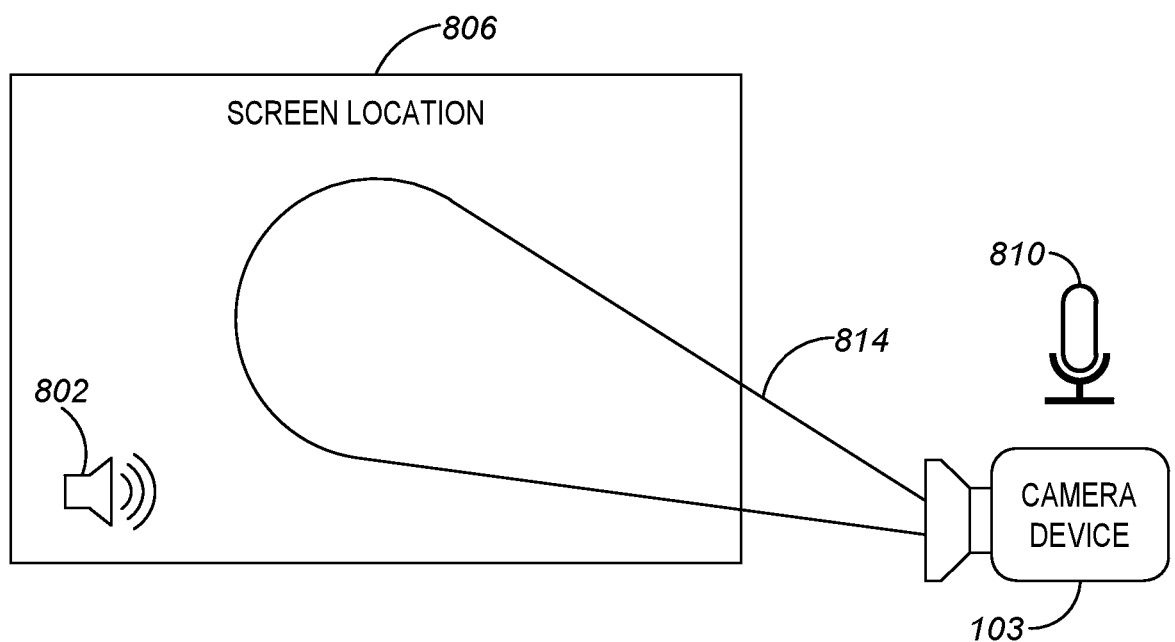
FIG. 9 is a diagram illustrating showing a data-over-sound example in accordance with an example embodiment.

With continuing reference to FIGS. 7 and 8, the illustrated method 509 next includes operating (560), concurrently with the capturing of the data-over-sound, an active camera (for example, of one of the video camera devices $103_1$-$103_q$) during the current sub-interval of the period of time to capture video (which, in the case of the illustrated example of FIG. 9, is video in which the location 806 is depicted (as well as objects present therein being captured in the video as well).

Next the illustrated method 509 includes the current sub-interval of the period of time ending (570) at $T_{N+1}$.

Next the illustrated method 509 includes decision action 580 in which it is determined whether or not there are any more sub-intervals of the period of time. If "NO", then the method 509 ends. If "YES", then the illustrated method 509 proceeds to the next sub-interval of the period of time (i.e. action 590), following which the actions 520, 530, 540, 550, 560 and 570 are repeated.

It will be understood that a verification method that is a counterpart method to the method 509 will be implementable and be similar to the method 400 (FIG. 7), except that the dynamically changing code will be read by way of sound analytics rather than video analytics.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and a human mind cannot introduce a dynamically changing code at a location in order to enhance authenticity detail of video to be captured, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method to enhance authenticity detail of video captured by a first camera having a first Field Of View (FOV), the computer-implemented method comprising:
repeatedly carrying out the following over a period of time:
generating, during a respective sub-interval of a plurality of sub-intervals of the period of time, a data structure that is a combination of:
distilled data comprised of aggregated video metadata of a respective plurality of different objects visible within the first FOV, and
at least one of timestamping data and a sequence number unique to the respective sub-interval of the period of time,
signing the data structure with a private key, and
generating, from the signed data structure, a portion of a dynamically changing code for the respective sub-interval of the period of time;
sequentially introducing, in portions, the dynamically changing code within the first FOV to be visibly perceived therein; and
operating the first camera to capture the video within which is shown the dynamically changing code and the different objects.

2. The computer-implemented method of claim 1 wherein the dynamically changing code is one of a dynamically changing QR code, a dynamically changing barcode, a dynamically changing pictogram, dynamically changing and formatted text, a dynamically changing dot-based code, a dynamically changing light intensity code, or a dynamically changing symbol.

3. The computer-implemented method of claim 1 further comprising at least one of storing the video in non-volatile storage media and transmitting the video over a network to an electronic device for viewing thereon.

4. The computer-implemented method of claim 3 further comprising:
receiving the video at the electronic device;
performing video analytics on the received video to extract the portions of dynamically changing code from the video;
determining, using a public key, that respective data structures obtainable from the portions of the dynamically changing code are properly signed; and
carrying out comparisons on each of the respective data structures to determine whether the video is authentic or not authentic.

5. The computer-implemented method of claim 1 wherein the aggregated video metadata of the respective plurality of different objects is created from video analytics processing of frames of the video and describes temporally changing features of the different objects.

6. The computer-implemented method of claim 1 wherein the different objects are a face and at least one other different body part of a single person.

7. The computer-implemented method of claim 1 further comprising operating a second camera to capture additional video within which is shown the dynamically changing code and the different objects, and
wherein the second camera has a second FOV different than the first FOV.

8. The computer-implemented method of claim 1 wherein the sequentially introducing of the portions of the dynamically changing code includes projecting the dynamically changing code onto a surface or displaying the dynamically changing code on an electronic display screen.

9. The computer-implemented method of claim 1 further comprising operating a projector, communicatively coupled to the first camera, to project the dynamically changing code onto a surface.

10. The computer-implemented method of claim 1 wherein the private key is a single private key stored on a server system remote from the first camera, and signing the data structure with the single private key is carried out by the server system.

11. A computer-implemented method to enhance authenticity detail of video captured by a first camera having a first Field Of View (FOV), the first camera also including or being locally coupled to a microphone, and the computer-implemented method comprising:
repeatedly carrying out the following over a period of time:
generating, during a respective sub-interval of a plurality of sub-intervals of the period of time, a data structure that is a combination of:
distilled data comprised of aggregated video metadata of a respective plurality of different objects visible within the first FOV, and
at least one of timestamping data and a sequence number unique to the respective sub-interval of the period of time,
signing the data structure with a private key, and
generating, from the signed data structure, a portion of a dynamically changing code for the respective sub-interval of the period of time;

sequentially introducing, in portions, the dynamically changing code by production of data-over-sound sufficiently loud to be captured by the microphone; and
concurrently with capturing of the data-over-sound by the microphone, operating the first camera to capture the video within which is shown the different objects, and
wherein the video captured by the first camera includes the data-over sound as part of a sound track of the video.

12. The computer-implemented method of claim 11 further comprising at least one of storing the video in non-volatile storage media and transmitting the video over a network to an electronic device for viewing thereon.

13. The computer-implemented method of claim 12 further comprising:
receiving the video at the electronic device;
performing audio analytics on the sound track of the received video to extract the portions of dynamically changing code;
determining, using a public key, that respective data structures obtainable from the portions of the dynamically changing code are properly signed; and
carrying out comparisons on each of the respective data structures to determine whether the video is authentic or not authentic.

14. The computer-implemented method of claim 11 wherein the aggregated video metadata of the respective plurality of different objects is created from video analytics processing of frames of the video and describes temporally changing features of the different objects.

15. The computer-implemented method of claim 11 wherein the different objects are a face and at least one other different body part of a single person.

16. The computer-implemented method of claim 11 further comprising operating a mobile device, that includes a second camera and a microphone, to capture additional video with a corresponding audio track, and
wherein:
the different objects are shown in the additional video,
the dynamically changing code is extractable from the audio track of the additional video, and
the second camera has a second FOV different than the first FOV.

17. The computer-implemented method of claim 11 wherein the private key is a single private key stored on a server system remote from the first camera, and signing the data structure with the private key is carried out by the server system.

18. A system comprising:
at least one processor configured to repeatedly carry out the following over a period of time:
generate, during a respective sub-interval of a plurality of sub-intervals of the period of time, a data structure that is a combination of:
distilled data comprised of aggregated video metadata of a respective plurality of different objects visible within a camera FOV, and
at least one of timestamping data and a sequence number unique to the respective sub-interval of the period of time,
sign the data structure with a private key, and
generate, from the signed data structure, a portion of a dynamically changing code for the respective sub-interval of the period of time; and an electronic projector or an electronic display configured to sequentially introduce, in portions, the dynamically changing code within the camera FOV to be visibly perceived therein.

19. The system of claim 18 further comprising a server machine remote from the camera FOV, the server machine including a storage device configured to store the private key, and wherein the private key is a single private key.

* * * * *